Feb. 27, 1934.    L. LANGHAAR    1,948,860
ANTIFRICTION BEARING
Filed March 22, 1930
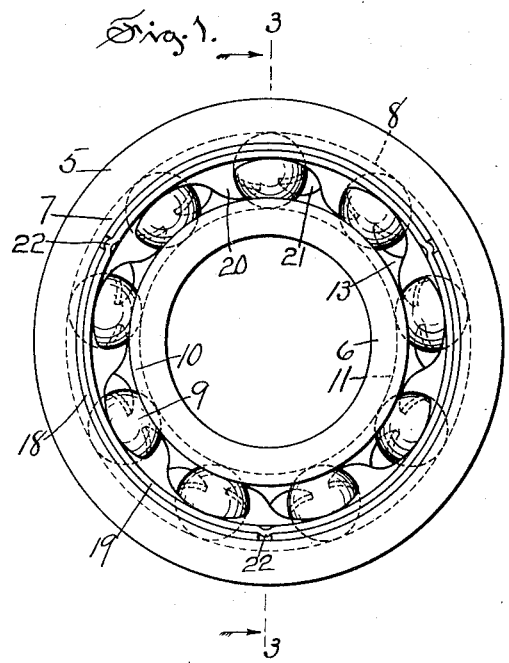
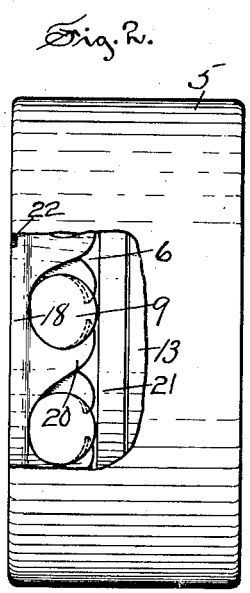
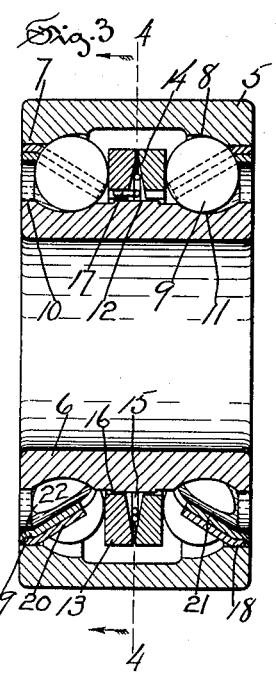
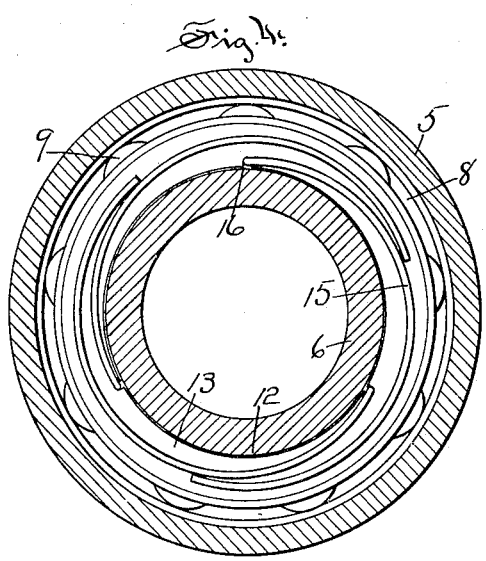
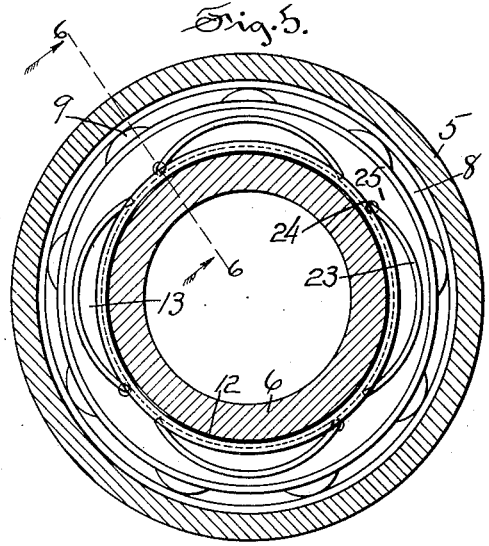
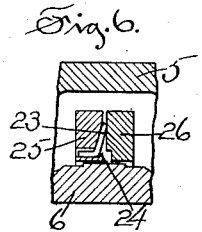
INVENTOR
Louis Langhaar,
by
Arthur B Jenkins,
ATTORNEY Patented Feb. 27, 1934

1,948,860

UNITED STATES PATENT OFFICE 1,948,860

ANTIFRICTION BEARING

Louis Langhaar, Allentown, Pa.

Application March 22, 1930. Serial No. 438,043

9 Claims. (Cl. 308—196)

My invention relates to the class of devices employed for supporting rotating parts in a manner to lessen the friction between the contacting surfaces, and an object of my invention, among others, is to provide a device of this class that shall be simple in construction, that may be readily assembled, and that shall be particularly efficient and durable as to operation.

One form of a bearing embodying my invention and in the construction and use of which the objects herein set out, as well as others, may be attained, is illustrated in the accompanying drawing, in which—

Figure 1 is an end view of my improved bearing.

Figure 2 is a side view with parts broken away to show construction.

Figure 3 is a view in section on a plane denoted by the dotted line 3—3 of Figure 1.

Figure 4 is a view in section on a plane denoted by the dotted line 4—4 of Figure 3.

Figure 5 is a view similar to Figure 4 but showing a little different form of adjuster for the ball rows.

Figure 6 is a view in cross section on a plane denoted by the dotted line 6—6 of Figure 5.

The anti-friction or ball or roller bearing embodying my invention and forming the subject matter of this application comprises an annular bearing with substantially concentric inner and outer raceways having unitary race members together with an internal self-adjusting device between the ball rows; also ball separators of peculiar construction for spacing the balls in each of the rows.

The particular features of my invention are to provide a self-adjusting ball or anti-friction bearing having both inner and outer race members unitary, to assure positive lubrication of the self-adjusting device, to provide ball separators adapted to the peculiar assembling conditions, and to provide means whereby the self-adjusting member may be at all times in substantially perfect resilient and dynamic balance by means of positively positioned springs operating on the wedge principle, and to assist the centralization of the ball separators by bearing contact with the outer race member.

It is old in the art to assist the centralization of separators by contact with the inner race member, but the outer member offers the advantages of larger and more durable wearing surfaces because of diametrical differences compared to the inner member, combined with better lubrication and at substantially the same relative speeds. Exact radial location of the ball separators is important for dynamic balance to withstand impact loads and for smooth operation at any speed.

In the accompanying drawing the numeral 5 indicates the outer member or case of my improved bearing and 6 the inner member or cone. These two members are each formed of a single piece of metal, the case 5 having flanges 7 at opposite ends within which paths or raceways 8 are formed, the flanges serving to retain the anti-friction members or balls 9 within the structure. The inner or cone member 6 in that particular structure shown herein has flanges 10 and a ridge 12 extending circumferentially between the paths 11.

A ball row adjusting device comprises two rings 13 each having an opening slightly larger than the diameter of the ridge 12. These adjusters are mounted side by side for rotation upon the ridge 12 and between the two rows of balls. These rings are formed to create an annular groove 14 tapering to a smaller cross sectional dimension outwardly. This groove may be formed in various ways. In the particular structure herein shown it extends from a wider dimension at the opening through the rings to a narrower dimension at the periphery thereof. As shown in Figure 3, both rings are beveled on the sides adjacent each other to create the tapered groove, whereas in Figure 6 only one of the rings is beveled to create such groove. Separators 15 are located between the adjuster rings, these separators acting to force the rings apart and maintain them in contact with the ball rows. In that form of the separator shown in Figures 1 to 4, springs 15 (four in number) are employed. Each spring is preferably composed of a piece of resilient curved wire. In that form shown in Figures 3 and 4 one end of each spring is bent at an angle to the main part and passed into a notch 16 on the inner edge of one of the rings 13 to act as a holder 17 to prevent the spring from creeping or moving around in the wedge shaped opening, thereby maintaining both resilient and dynamic balance.

I contemplate, however, different arrangements of the pockets or spaces between the adjuster rings and different forms of separators, the spaces or pockets and the separators co-acting to maintain a constant force on the adjuster rings tending to separate them. A spacer is located in the annular space between the flanges 7 and 10 at each end of the bearing. Each of these spacers comprises two rings, the outer ring 18 quite closely fitting the wall of the opening in the flange 7, and the inner ring 19 quite closely fitting against the ring 18. Each of these rings have spacers in the form of prongs 20 and 21 projecting diagonally from the ring and as shown in the dotted lines in Figure 3. These prongs are formed so that two prongs, one from each ring of each spacer, partially encircle each ball to retain it in place. The inner ring 19 is preferably secured to the outer ring 18 in a manner to prevent independent movement of the rings, in the structure herein shown, the inner ring having a series of lugs 22 each projecting into a notch in the outer ring, and as shown in Figure 1 of the drawing, though other means for accomplishing this purpose may be employed.

The bearing shown in Figures 5 and 6 is of substantially the same construction as that hereinabove described. This latter form of bearing comprises separators in the form of springs 23 that are somewhat shorter as to length than are the springs 15. They differ from the springs 15 in that the latter are so formed that when flexed and placed in the bearing they tend to straighten, when in the position shown, whereas the springs or separators 23 are of sharper curvature and when flexed and inserted in the bearing they tend to arch, each form, however, tending to wedge the sections of the adjuster apart.

Also whereas the separators 15 react against the notches 16, the separators 23 react against a holder lip 24 on one of the adjuster rings 25, each form being positioned thereby against bodily movement transversely of the bearing axis. In other words the springs or separators 15 act by expansive force, whereas the springs or separators 23 act by contractile force to produce the same ultimate effect, to wit, separation of the adjuster members.

It will be noted that in operation the separator springs 15 and 23 exert a force outwardly against the adjuster rings 13 and 25, and the latter are therefore held with a resultant pressure against the rows of balls 9 and the latter are consequently restrained from movement toward each other and are adjustably held in the race members in running contact therewith.

The adjuster and the spacer rings are of such size that they may be passed through the opening in the ends of the outer member or ball case of the structure. The balls may be assembled in the bearing in any manner common to structures of this class. Preferably, the outer diameter of the adjuster rings 13 and the inner diameter of the ball case 5 at their diametrically opposite surfaces are of a size to permit sufficient radial displacement while assembling for the introduction of the balls, as by "eccentric loading". The spacer rings 18 and 19 are then inserted, the prongs 20 being shaped to enable them to be passed between adjacent balls, and then by pivotal relative rotation of the spacer rings the coacting prongs on said rings respectively engage each ball to form together a series of ball pockets, after which the rings 18 and 19 may be locked together in any suitable manner.

The adjuster rings 13 and the inner ball member 6 have a differential rate of rotation proportional to the bearing speed, and as the rings are in running contact with the ridge 12, it is essential to have good lubrication between them. Lubricant will inevitably work between them to some degree sufficient for ordinary purposes. However, as the bearing herein shown and described is adapted for extraordinary purposes, extraordinary precautions are advisable. Where the adjuster rings 13, 25 and 26 bear on the ridge 12, the width of the bearing surface on said ridge is slightly narrower than the total width of the rings 13. Therefore, lubricant thrown from the ridge 12 by centrifugal force, or which would naturally work onto the ridge 12 from the inner raceways, will be carried between the aforesaid bearing surfaces of the ridge and rings, providing therefore an efficient method of lubrication at any speed.

The adjuster ring 26, in that form of the structure shown in Figure 6 is not beveled on the surface facing its companion ring.

The unitary construction of the raceways is of great importance in facilitating that high degree of accuracy so vital to structures of this class.

While unitary races are common among the more elementary types of bearings the attainment of unitary raceways, both inner and outer, in the bearing herein shown, described and claimed involves the solution of difficult problems. Not only must the parts be assembled but they must all be of proportionate size and strength, as bearings of this type are subjected to severe service.

Unitary inner and outer races result also in marked economy in material and fabrication costs. The peculiar construction of the ball spacers involves part of the solution of the assembling problem, and is to be considered concurrent with unitary raceways.

Not only are special problems encountered in the introduction of suitable ball spacers, but the assembling and construction of the self-adjusting device to restrain the parts thereof in proper operative position while assembling the bearing is a problem in itself, all concurrent with unitary raceways.

Hence special emphasis is placed on unitary raceways as marking a decided improvement in bearings of this particular type and involving special treatment. However, I claim and describe the structure or final result rather than the processes of evolution and fabrication, as the result is the purpose.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A ball bearing comprising an outer race member having two internal ball races formed in a single piece of material, an internal race member having two external ball races formed in a single piece of material, rows of balls disposed between said members and in running contact therewith, a composite self-adjusting device between and in running contact with said rows, said device being introduced through an end orifice of the outer race member, and an independent two-piece separator for the balls of each row respectively, each of said pieces having a separating prong located on the opposite side of a ball from that on the other piece.

2. A ball bearing comprising an outer race member, an inner race member, a row of balls between them, a ball separator for said balls having centralizing bearing contact with an inner surface of the outer race member on one side of the raceway therein and having separating prongs projecting in the same direction and located on opposite sides of each ball in said raceway.

3. A ball bearing comprising an inner member and an outer member, each formed of a single piece of metal, a row of balls located between said members, and a separator for spacing the balls, said separator comprising two rings disposed at the same outer end of the opening between said bearing members and with prongs projecting from said rings engaging the sides of said balls to retain them in place circumferentially.

4. A ball bearing comprising an inner member and an outer member each formed of a single piece of metal and with two raceways between them, a row of balls located at each of said raceways, and a ball separator comprising two rings disposed in the opening in the end of and between said bearing members with prongs projecting from said rings on opposite sides of each ball.

5. A ball bearing comprising an inner member and an outer member, each formed of a single piece of metal, a row of balls located between said members, and a separator comprising two rings located one against the other and located in the end of the opening between said bearing members, each of said rings having a set of prongs projecting on opposite sides of the balls from prongs located on the other ring.

6. A two-row two-point race contact, annular ball bearing comprising a unitary outer race member having two internal raceways, a unitary inner race member having two external raceways, two rows of balls in said raceways, a free annular device laterally introduced into the space between the inner and outer race members and positioned between and in contact with the adjacent sides of both ball rows and a recess between the raceways of one of said race members of suitable dimensions to permit eccentric relative displacement of the inner and outer race members to facilitate inserting the balls in the raceways, with the aforesaid annular device disposed between the inner and the outer race members.

7. A two-row two-point race contact, annular ball bearing comprising a unitary outer race member having two internal raceways, a unitary inner race member having two external raceways, two rows of balls in said raceways, a free annular device laterally introduced into the space between the inner and outer race members and positioned between and in contact with the adjacent sides of said ball rows, and a recess between the raceways of the outer race member of suitable dimensions to permit eccentric relative displacement of the inner and the outer race members to facilitate inserting the balls in the raceways with the aforesaid annular device disposed between the inner and the outer race members.

8. A ball bearing comprising an outer race member having two internal ball races formed in a single piece of material, an internal race member having two external ball races formed in a single piece of material, rows of balls disposed between said members and in running contact therewith and a self-adjusting device proportioned for introduction through a side opening in the outer race member including axially shiftable members and a spring element interposed between said members to effect contacts of said members with their respective ball rows and anchored to prevent body translation.

9. A ball bearing comprising an outer race member having two internal ball races formed in a single piece of material, an internal race member having two external ball races formed in a single piece of material, rows of balls disposed between said members and in running contact therewith and a self-adjusting device proportioned for introduction through a side opening in the outer race member including a pair of axially shiftable members and a series of spring elements interposed between said members to effect contacts of said members with their respective ball rows, each spring element being anchored to a shiftable member to prevent body translation.

LOUIS LANGHAAR.